Figure 1:
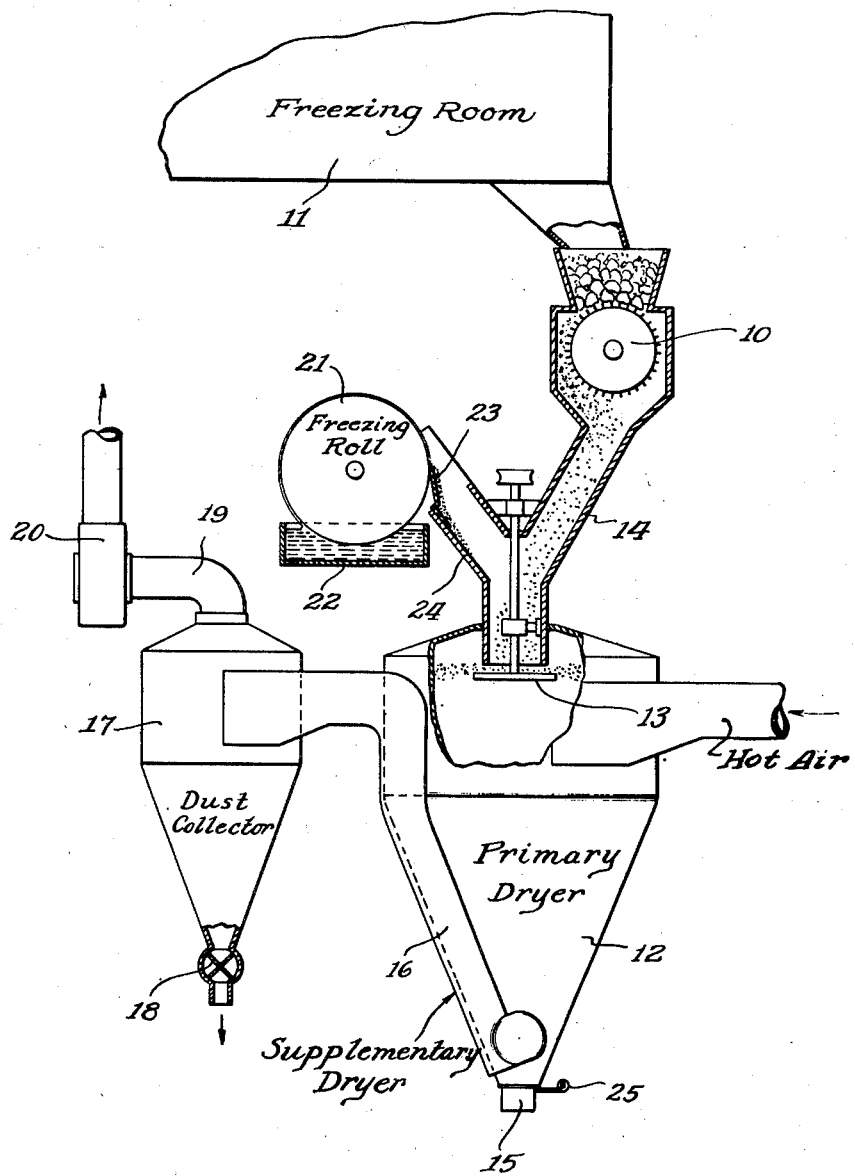

April 12, 1949.  J. L. KELLOGG  2,467,318
METHOD OF DEHYDRATING FOOD PRODUCTS
Filed Dec. 20, 1943

Inventor
John L. Kellogg.
By Barnett & Truman
Attorneys

Patented Apr. 12, 1949

2,467,318

UNITED STATES PATENT OFFICE 2,467,318

METHOD OF DEHYDRATING FOOD PRODUCTS

John L. Kellogg, Chicago, Ill., assignor, by mesne assignments, to John L. Kellogg & Co., South Elgin, Ill., a corporation of Illinois Application December 20, 1943, Serial No. 514,903

2 Claims. (Cl. 99—204)

This invention relates to an improved method of dehydrating food products, particularly fruits, vegetables, meats and their extracts.

It has been customary heretofore to dry materials of the above character in tunnels, vacuum driers, spray driers or by the use of heated rolls. The character of the material and the size of the particles to be dried usually determined the method and apparatus employed. For example, if the material to be dehydrated were lumpy or otherwise of a character which normally requires drying for long periods of time at relatively low temperatures so as to prevent conversion of its starch or other constituents, discoloration or deterioration in quality, the material was usually dried according to the tunnel method. In some cases it was practical to use vacuum driers. If the material were in the form of a liquid which might be dried without injury at relatively high temperatures, spray driers or hot roll driers were ordinarily used.

The present method contemplates the use of one or more of the apparatuses above mentioned, but because of certain steps in the present method preliminary to the actual drying operation, the use of such apparatus is made more effective and the product itself is improved in quality in that the principles which give flavor and aroma to the product are not dissipated or materially altered, as is usual in other methods employing high temperatures.

A principal object of the present invention is to provide an improved method of dehydrating substances of the above character in which high temperatures may be used to vaporize the water content thereof and at the same time avoid overheating the materials.

The invention includes, as a further object, provision of a method which can be employed to thoroughly dehydrate materials of the above character and which will be equally useful in connection with concentration of liquids, such as fruit juices, coffee extracts and other products in which preservation of the natural flavor and aroma of the product is important.

Another object is to provide an improved method for dehydrating cellular organic substances which include a step preliminary to the drying operation which so conditions the material that the water content thereof is more easily liberated from the cellular structure, thereby effecting quick and thorough drying of the material. In this connection the invention contemplates chilling and/or freezing the material before the drying operation so that the low temperature of the material will operate, when it is introduced into the drier, to supplement the cooling effect due to evaporation of the moisture, and thereby offset any tendency which the relatively high drying temperatures might otherwise have to adversely affect the quality of the material. Furthermore, the preliminary freezing of the water content thereof in the material expands or strains the cellular structure thereof, whereby the porosity of the material is increased. This expansion of the celluar structure serves to expedite liberation of moisture during the drying operation.

The present method, briefly described, includes the chilling and/or freezing of the material to be dehydrated and subjecting the material, while in its chilled or frozen state, to suitable drying temperatures preferably, though not necessarily, heated air. If a drying tunnel is employed, the air is preferably of lower temperature than when using a spray drying apparatus. When using a tunnel, the air is preferably introduced at temperatures of 140° F. to 180° F. When using a spray drying apparatus, the drying temperature may be 350° F. or higher. In either case, the air is introduced into the drying chamber at a location near the entrance of the chilled or frozen material into the drier, whereby the material is subjected to the highest temperature at the beginning of the drying operation. In this way, the temperature of the air is reduced by contact with the low temperature material as the drying operation progresses, for example, as the material moves toward the discharge end of a continuously operable drying apparatus. In some instances, as above indicated, it may be preferable to employ vacuum driers of the shelf type. In this event, the amount of heat supplied to the several shelves will be controlled so that the drying chamber will be hottest at the entrance end and progressively decreases in temperature toward the discharge end of the apparatus.

The degree of chilling or freezing employed and the specific manner in which the material is prepared for the drying operation will depend somewhat upon the character of the material and the end product desired. For example, when dehydrating leafy material such as lettuce, tea leaves, and other similar material, the material is preferably chilled but not frozen. The low temperature at which it is introduced into the drier serves to supplement the cooling action on the material incident to evaporation of the moisture therefrom and, therefore, permits the use of higher drying temperatures without danger of overheating the material. The leafy material and other materials such as fruits and vegetables, either whole, sliced or diced, as well as thinly sliced and shredded meats, after being suitably chilled or frozen, are placed on movable conveyors or in basket containers and passed through a suitable drying chamber, for example, a tunnel drier or a vacuum shelf drier.

When dehydrating fruits and vegetables, the materials are first washed to remove all foreign matter from their outer skins. In some instances the material may be peeled, sliced, shredded, diced or otherwise prepared in the shapes desired for later use. In other instances, the unpeeled whole fruit or vegetable may be sent direct from the washers to the freezing room.

When dehydrating some vegetables, for example potatoes, it is preferable to blanch or precook them prior to the freezing operation. In such cases the vegetables are blanched from one-half to ten minutes in boiling water depending upon the size of the material being treated. As an alternative to the blanching operation, the material may be precooked under steam pressure of about 15 pounds pressure for approximately five minutes.

When the material is blanched or partly cooked, it is cooled and then frozen at temperatures of −2° F. to −40° F. until the water content thereof is crystallized throughout the material. The freezing of the water content in the individual pieces of material expands or strains the cellular structure thereof so that the moisture is more effectively liberated and consequently more quickly evaporated. The cooling effect of the ice crystals on the material during the drying operation, together with the cooling effect due to the evaporation of the moisture therefrom, makes it practical to utilize higher drying temperatures than otherwise permissible without danger of overheating or changing the character of the material. The low temperatures of the material also make it practicable to apply the hottest drying temperature to the material at the beginning of the drying operation and progressively less heat to the partially and fully dried material.

Apparently the cooling effect of the ice crystals on the material being dried together with the fact that the fibers and tissue of the material are expanded or strained by the formation of the ice crystals provides enlarged passages for the escape of water and vapor which might otherwise be entrapped in the material. The expanded or increased porosity of the cellular structure, therefore, brings about more rapid evaporation, and this condition naturally increases the cooling effect on the material in a manner to prevent heat discoloration and bleaching of the material. By maintaining the material at a relatively cool temperature during the drying operation, it retains its natural color and flavor.

In addition to the above mentioned advantages, the expanded cellular structure of the dehydrated material, resulting from the prefreezing operation, responds more quickly to the evaporation of liquid during the customary soaking of dehydrated products preliminary to the final cooking.

The dehydrating method of this invention, including the improved prefreezing step, can be used to marked advantage in connection with the drying of vegetables and fruit pulps and in the concentrating of liquids, for example, fruit and vegetable juices, milk and coffee extracts. Ordinarily any of the known drying apparatuses may be used in connection with many of the products dehydrated under the present method. However, when the material to be dried is in the form of a pulp, juice, milk or coffee extract or any other finely divided or liquid material, a drying apparatus of the general type used in spray drying may be used to advantage.

The figure of the drawing, appended hereto, illustrates somewhat diagrammatically an apparatus constructed along the line of known spray driers but modified in certain respects to facilitate the handling of the frozen pulp and liquid materials.

When dehydrating fruits or vegetables in which the end product is to be in the form of a powder or granules, the material is preferably sliced or otherwise reduced to particles of uniform size. The material thus prepared may be sent direct to the freezer wherein it is frozen to a relatively solid mass. However, in many instances, for example in the preparing of potatoes and similar products, the sliced material is preferably blanched by dipping them into boiling water for one-half to ten minutes; or when it is desirable to precook the material, it may be cooked in a retort for about five minutes under 15 pounds steam pressure. The amount of cooking in the present case, as hereinbefore referred to, will depend upon the particular fruit or vegetable, as the case may be, and the size of the particles. After the blanching or precooking of the material, it is permitted to cool and thereafter is frozen quickly at temperatures from −2° F. to −40° F. Preferably, the freezing period is continued long enough to crystallize all moisture in the material. In the case of a liquid such as fruit and vegetable juices, milk and coffee extracts, the material is preferably frozen solid.

After freezing the sliced vegetables, they may be broken up by a suitable disintegrator, for example a rotary grater such as indicated at 10 in the drawing. For convenience, the frozen material may be passed directly from the freezing room 11 into the grating apparatus. The finely divided frozen particles, when disintegrated in the above manner, resemble frozen ice or snow flakes and are fed into the upper end of a cyclone drier 12 through which heated air is forced in a known manner.

If material, such as above referred to, is not frozen, the separate finely divided particles thereof tend to paste or adhere together. This not only interferes with the feeding of the material into the drier but also forms lumps of unequal size which, because of their compressed character and variation in size, are not dried uniformly. However, when the material is frozen and grated, as above described, the frozen particles remain separate from each other so as to facilitate the handling and drying operations. In this connection, the apparatus shown herein includes a rotating disk 13 which is positioned below the chute 14 for delivering the material into the upper end of the drier 12. The disk 13 is preferably rotated at high speed so as to throw the material outwardly with centrifugal force toward the walls of the drying chamber. The drying air is introduced into the upper end of the drying chamber at a tangent thereto and at a preferred temperature of 350° F. However, the temperature may be considerably higher or lower, for example 104° F. to 400° F., depending upon the material being dehydrated and upon the character of the end product desired. The hot air travels in a downward spiral in the drier casing and carries the material with it in its path of travel. The low temperature of the material as it is thrown from the disk 13 reduces the temperature of the air and continues to reduce it as the drying operation progresses. The low temperature of the material, due to the presence of the ice crystals therein, prevents overheating when coming into contact with the relatively high initial temperature of the drying air and maintains the particles of material relatively cool during the entire drying operation. If the material is sufficiently dried in chamber 12, it may be discharged from the spout 15 at the lower end thereof. However, in most cases if a powdered or dried product is desired, the drying operation is continued through the supplemental drier 16 and is delivered into the upper portion of the cyclone separator.

The dried product precipitates to the bottom of the separator and is discharged at the lower end through a revoluble valve 18. The air passes out from the separator and is drawn out through pipe 19 by means of a fan 20. This air may be discharged to the atmosphere or if it contains any substantial amount of the dried material, it may be again passed through one or more separators to remove the material from the drying air.

The same series of steps, as hereinabove described in connection with fruits and vegetables, are followed in connection with the dehydration of fish and cured meats of various kinds. However, when fresh meats are being dried, they are not ordinarily blanched or precooked, but are sent direct to the freezing chamber and thence to the grating apparatus 10. It is then delivered into the drier, for example a cyclone drier, and carried through the supplemental drier into the cyclone separator in substantially the same manner as hereinbefore described in the drying of vegetables. When drying cured meats and sea foods, the blanching and precooking may be optional. It has been found in connection with the drying of meats that the initial freezing not only separates the meat fibers so as to readily liberate the moisture content but also serves to preserve the natural color of the meat. For example, in dehydrating the meat, such as beef, the end product retains its rich natural color. The same is true when dehydrating sea foods and other meat products, since the frozen crystals in the product serve to supplement the cooling action due to evaporation to an extent sufficient to preserve their natural colors.

When dehydrating liquids either to form a dry powder or to concentrate the materials to a thicker liquid, the liquid is frozen on a freezing roll 21, the roll being constructed and arranged to dip into a reservoir 22 containing the liquid. The frozen material is then scraped off the roll, for example, by means of a knife 23, so as to form relatively thin snow or ice flakes in which the pulp or solid material is held in a fixed position by reason of the ice crystals. This finely divided material is fed downwardly through the conduit 24 onto the rotating disk 13 and from there it is thrown outwardly by centrifugal force into the swirling currents of hot air delivered into the upper end of the cyclone drier. If the end product is to be in the form of a thick liquid, this liquid can be removed from the lower end of the drier by opening the valve 25 thereof so as to discharge the liquid through the spout 15. If the end product is to be in the form of a powder, then the drying operation is continued so as to carry the material through the supplemental drier 16 and deliver it into the upper end of the cyclone separator 17. It is discharged from the lower end of the separator through the rotating valve 18, the air being withdrawn from the separator 17, as previously described, through the discharge pipe 19 by means of a fan 20.

It will be observed that by the use of this method in connection with the drying of liquids, the material is concentrated or thoroughly dried, as the case may be, at a relatively low temperature, thereby retaining a large portion of the aroma and flavoring principles of the material which are highly fugitive in character and easily dissipated by high temperatures.

When the end product is to be in the form of a powder or granule, the evaporation of the ice crystals leaves the expanded filaments in a loosely interlaced arrangement whereby they may be readily mixed with water to form a beverage or paste-like product.

I claim:

1. The method of dehydrating organic cellular material which includes the steps of freezing the material so as to freeze the water content thereof and thereby expand the cellular structure of the material and thereafter reducing the material to small particles and feeding them at a uniform rate into an air stream heated to approximately 350° F. wherein the frozen water content is quickly vaporized while the material is in suspension and before the frozen water returns to the liquid phase whereby the presence of ice crystals in the material together with the additional cooling effect due to quick evaporation maintains the material relatively cool.

2. The method of dehydrating organic cellular material which includes reducing the material to a pulp, freezing the pulp into a solid mass, thereafter disintegrating the frozen pulp to form small particles and passing the frozen particles in a hot air stream through a drying zone in which the air is heated to approximately 350° F. at the point of its initial contact with the material to quickly evaporate the moisture therefrom.

JOHN L. KELLOGG.

REFERENCES CITED

The following references are of record in the file of this patent:

UNITED STATES PATENTS

| Number | Name | Date |
| --- | --- | --- |
| 698,534 | Morel | Apr. 29, 1902 |
| 864,978 | Morel | Sept. 3, 1907 |
| 1,712,785 | Becker | May 14, 1929 |
| 1,771,139 | Novotny | July 22, 1930 |
| 1,968,910 | Poole | Aug. 7, 1934 |
| 1,979,124 | Tival | Oct. 30, 1934 |
| 2,079,514 | Leetz | May 4, 1937 |
| 2,134,229 | Lipscomb | Oct. 25, 1938 |
| 2,174,873 | Downes et al. | Oct. 3, 1939 |
| 2,178,818 | Earp-Thomas | Nov. 7, 1939 |
| 2,180,968 | Schorn et al. | Nov. 21, 1939 |
| 2,292,447 | Irwin | Aug. 11, 1942 |
| 2,330,545 | Benoit | Sept. 28, 1943 |
| 2,333,850 | Dunkley | Nov. 9, 1943 |
| 2,368,811 | Einarsson | Feb. 6, 1945 |